United States Patent [19]

Ludwig

[11] 3,968,330

[45] July 6, 1976

[54] CODE GENERATOR FOR TELEPRINTERS OR DATA PRINTERS

[75] Inventor: Martin Ludwig, Munich, Germany

[73] Assignee: Siemens Aktiengesellschaft, Berlin & Munich, Germany

[22] Filed: Jan. 16, 1975

[21] Appl. No.: 541,616

[30] Foreign Application Priority Data
Jan. 25, 1974    Germany............................ 2403599

[52] U.S. Cl.................................. 178/79; 178/2 R
[51] Int. Cl.².......................................... H04L 15/00
[58] Field of Search................ 340/174 LC, 173 SP, 340/173 PP, 166 R; 178/2, 3, 79

[56] References Cited
UNITED STATES PATENTS

| | | | |
|---|---|---|---|
| 3,374,309 | 3/1968 | Elich et al............................ | 178/2 R |
| 3,456,240 | 7/1969 | Hays........................................ | 178/3 |
| 3,482,035 | 12/1969 | Greenwood............................ | 178/3 |
| 3,717,723 | 2/1973 | Jaskulke et al......................... | 178/3 |
| 3,720,925 | 3/1973 | Ross................................ | 340/173 PP |
| 3,797,022 | 3/1974 | Beam et al..................... | 340/173 SP |

OTHER PUBLICATIONS

Krick: "MNOS Electronically Alterable Read—Only Stores", IBM Tech. Discl. Bull, vol. 13, No. 4, Sept. 1970, pp. 969–970.

*Primary Examiner*—Thomas A. Robinson
*Attorney, Agent, or Firm*—Hill, Gross, Simpson, Van Santen, Steadman, Chiara & Simpson

[57] ABSTRACT

A code generator for teleprinters or data printers which, for the recognition of the subscriber, emits a sequence of character signals assigned to the subscriber. A memory is provided which is constructed from electronically operable storage elements in which the character signals are stored and are not altered after the disconnection of the operating voltage. Registers are provided which contain the addresses of the particular operated storage elements and a read-out control unit is provided by means of which the character signals are read out from the storage elements.

10 Claims, 4 Drawing Figures

CODE GENERATOR FOR TELEPRINTERS OR DATA PRINTERS

BACKGROUND OF THE INVENTION

1. Field of the Invention

This invention relates to a code generator for teleprinters or data printers which emits a sequence of character signals assigned to a subscriber for the recognition of the subscriber.

2. Description of the Prior Art

Code generators are conventionally provided in teleprinters or data printers. After the establishment of a connection between a first subscriber station and a second subscriber station, the code generator in the teleprinter or data printer of the first subscriber station is triggered, for example, by the second subscriber station after the depression of a key which initiates a call "who is there?". The code generator emits a sequence of character signals which is assigned to the first subscriber station and with the aid of which the second subscriber station is able to establish whether a correct connection has been formed. It is also possible for the code generator in the teleprinter or data printer of a subscriber station to be triggered by the subscriber himself by the depression of a "here is" key.

It is already generally known in the art to employ mechanical code generators in teleprinters or data printers. In one type of code generator the character signals are stored in comb-like components which are arranged radially on a roller. The number of comb-like components is equal to the number of character signals to be emitted by the code generator. Each comb is provided with teeth, the number of which is the same as the number of elements in one character signal. Each tooth is assigned to one data element of the character signal having a starting pulse polarity and for every data element of the character signal having a stopping pulse polarity one tooth must be extracted from the comb. The roller is moved for interrogating the character signals and contacts are opened or closed in dependence upon the presence or absence of teeth.

The known code generator has the disadvantage that mechanical intervention is required in order to modify the character signals. In addition, the code generator consumes a large amount of power due to the necessity of using a motor magnet for moving the roller. The contacts require interference suppression elements in order to ensure a satisfactory operation with the electrical units of the teleprinter or data printer. The return of the code generator to its basic position necessitates expensive procedures if, for example, during the transmission of the character signals the connection to the second subscriber is broken or the power supply, usually conventional supply means, fails. Furthermore, the known code generator has the disadvantage that it contains moving mechanical components which are subjected to wear and which give rise to noise.

SUMMARY OF THE INVENTION

The object of the present invention is to provide a code generator which does not contain moving mechanical components and which is not, therefore, subject to the aforementioned disadvantages.

In accordance with the invention, the foregoing object is realized in a code generator of the type initially described in that a memory is provided which is composed of electronically operable storage elements and in which the character signals are stored, and wherein the character signals are not altered after the disconnection of the operating voltage. Further, registers are provided which contain the addresses of the particular operated storage elements and a read-out control unit is provided with the aid of which the character signals are read out from the storage elements.

A code generator constructed in accordance with the invention has the advantages that it has a small power consumption and a small volume. In addition, such a code generator requires little servicing as it does not contain any moving mechanical components which are subjected to wear. Furthermore, the code generator operates entirely without noise. No interference suppression elements are required between the code generator and the electrical units of the teleprinter or data printer, and with the aid of a resetting signal the code generator is very easily reset to its basic position.

The code generator requires a particularly low amount of power and has a particularly small volume if a semiconductor memory is employed.

If the memory is to be able to be easily changed, it is advantageous to provide, as a memory, a semiconductor memory which is constructed from MNOS (metal-nitride-oxide-substrate) transistors in which recordings can be made as often as desired.

If it is ensured that the character signals in the code generator are altered only infrequently, it is advantageous for the memory to be constructed in the form of a fixed word store whose contents cannot be altered after the entry of the character signals.

As the character signals are always read out in the same sequence, the operation of the storage elements becomes particularly simple if the registers are in the form of shift registers exhibiting feedback which are connected to one another in such a manner that the contents of the register indicating the column of the matrix is shifted by one position after each cycle of the register indicating the row of the matrix.

In order to ensure that each stored character signal is available complete for transmission, it is advantageous for the register indicating the row of the matrix to be supplied with a pulse train whose repetition frequency is designed to be such that one character signal is read out from the memory during a start element produced prior to the transmission in the transmitter.

The change in the fixed sequence of character signal is particularly simple if a write-in control unit is provided by means of which the character signals are written into the memory.

To ensure that the stipulated sequence of character signals is not altered by unauthorized persons, it is expedient for the write-in control unit to be arranged on a plug-in component assembly and that only authorized personnel have access to the plug-in component assembly.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENT

Figure 1:
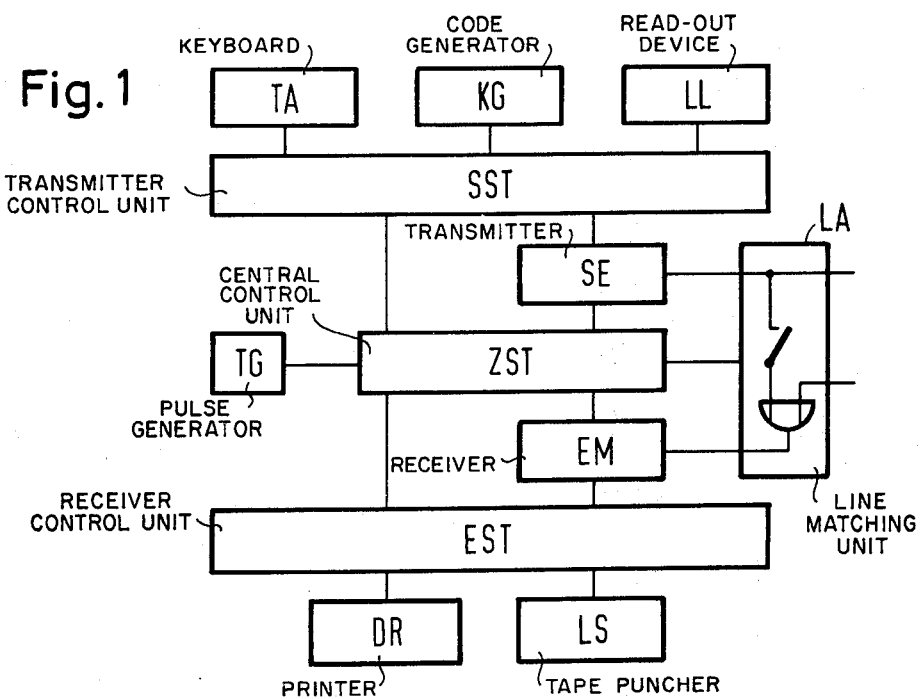
FIG. 1 is a block circuit diagram of a teleprinter.

Referring first to the block circuit diagram of a teleprinter illustrated in FIG. 1, a teleprinter is illustrated as comprising a plurality of receiving-end and transmitting-end peripheral units, a central component for the control unit of the teleprinter and a line matching unit LA which is connected between the teleprinter and a remote switching device which is not illustrated on the drawing.

More specifically, a keyboard TA, a code generator KG and a punched tape read-out device LL are represented as transmitting-end peripheral units. The transmitting-end peripheral units are controlled by a transmitter control unit SST. The receiving-end peripheral units shown are a printer DR and a tape puncher LS which are controlled by a receiving control unit EST.

In the central part of the teleprinter illustrated in FIG. 1 is a transmitter SE, a receiver EM and a control unit ZST which is connected to a pulse generator TG. The transmitter SE contains a parallel-serial converter which converts the parallel-coded data emitted by the transmitting-end peripheral units into serial-coded data. The serial-coded data are emitted via the line matching unit LA and via the remote switching device to a teleprinter line. The receiver EM is supplied via the first input of an OR gate in the line matching unit LA by the teleprinter line with serial-coded data. The receiver EM contains a serial-parallel converter which converts the serial-coded data into parallel-coded data and emits the parallel-coded data via the receiver control unit EST to the printer DR and/or to the tape puncher LS.

The central control unit ZST is connected to the transmitter control unit SST, to the receiver control unit EST, to the transmitter SE, to the receiver EM and to the line matching unit SA and controls the time sequence of the functions in the teleprinter. The line matching unit LA contains a switch by way of which the transmitted character signals are switched through, for example, in the case of semi-duplex operation, from the transmitter SE by way of a second input of the OR gate to the receiver EM. The character signals are conducted to the printer DR in order to print out all the transmitted character signals as a means of checking transmission.

After the print out of the key "here is" in the teleprinter, or after the reception of a "who is there" signal, the code generator KG is triggered in the teleprinter. Under the control of the transmitter control unit SST, the code generator KG emits, for example, 20 character signals via the transmitter SE and the line matching unit LA to the teleprinter line. The 20 character signals each consist of five elements, when the CCITT Code No. 2 is used, and contain data which serve to enable the subscriber to be recognized.

Figure 2:
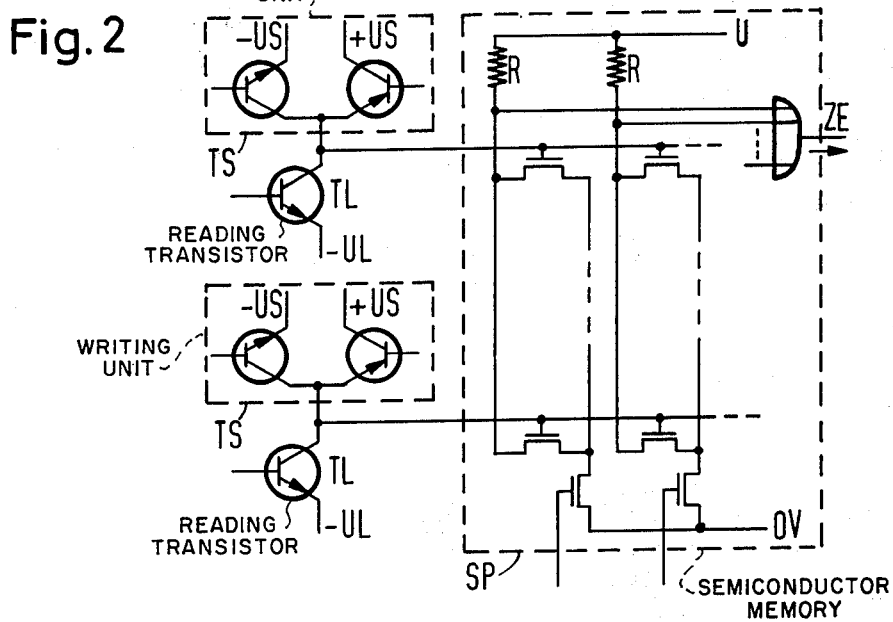
FIG. 2 is a schematic circuit diagram of a semiconductor memory constructed from MNOS transistors.

The circuit diagram illustrated in FIG. 2 shows a memory SP which is suitable for use in a code generator, with associated transistors TS for writing in the character signals and associated transistors TL for reading out the character signals. The memory SP illustrated in FIG. 2 is a semiconductor memory which is composed of MNOS (metal-nitride-oxide-substrate) transistors, for the storage of binary values. Because of the use of MNOS transistors, in contrast to conventional semiconductor memories in which recordings can be made, the memory SP retains its stored binary values even after the disconnection of its operating voltage. Such a memory is well known in the art and is described, for example, in the magazine "Elektronik-Industrie", June 5, 1972, Pages 94 and 95.

The MNOS transistors are arranged in a form of a matrix in several rows and several columns. The gate insulators of the MNOS transistors consist of a double layer which is composed of an oxide layer or a nitride layer. So-called points of adhesion are located at the boundary between these two layers. These can be recharged by a voltage pulse across the gate electrode. The start voltage of the MNOS transistor is thus displaced. A voltage pulse of opposite polarity cancels out the shift of the start voltage. The two start voltages are assigned the binary values 0 and 1.

The gate terminals of the MNOS transistors of a row are connected to one another and the source or drain terminals of a column are connected to one another. In FIG. 2, the memory SP is only illustrated with four storage elements to represent an arrangement of two rows and two columns. This is a symbolic representation and, of course, can be expanded in the row and column directions.

Prior to the writing of binary values, the memory is erased by the writing process for storing the binary values. For this purpose, a positive voltage pulse is connected to each line connected to the gates via those of the transistors TS to which a positive voltage +US is connected. At the same time, the source lines are connected via further MNOS transistors to a reference potential and the drain lines are connected via resistors R to an operating voltage U.

After the erasure of the memory SP, data is recorded in the individual storage elements successively. The MNOS transistors located between the source lines and the reference potential indicate into which column a binary value is written and the transistors TS indicate into which row writing occurs. In dependence upon whether a transistor TS is conductive, to which a positive voltage +US or a negative voltage —US is connected, the binary value 0 or 1 is written into the particular storage element which has been operated.

On the read out of the character signals from the memory SP, the individual storage elements are read out consecutively. The column in which read out is to take place is established via the source lines and one of the transistors TL establishes from which row read out is to be effected. A negative voltage —UL is connected to the gate lines by way of the transistor TL. On the source line which is connected to the storage element which is to be read out a binary signal is emitted which is assigned to the binary value of the storage element. The binary signal is emitted by way of an OR gate to an output of the memory SP.

Figure 3:
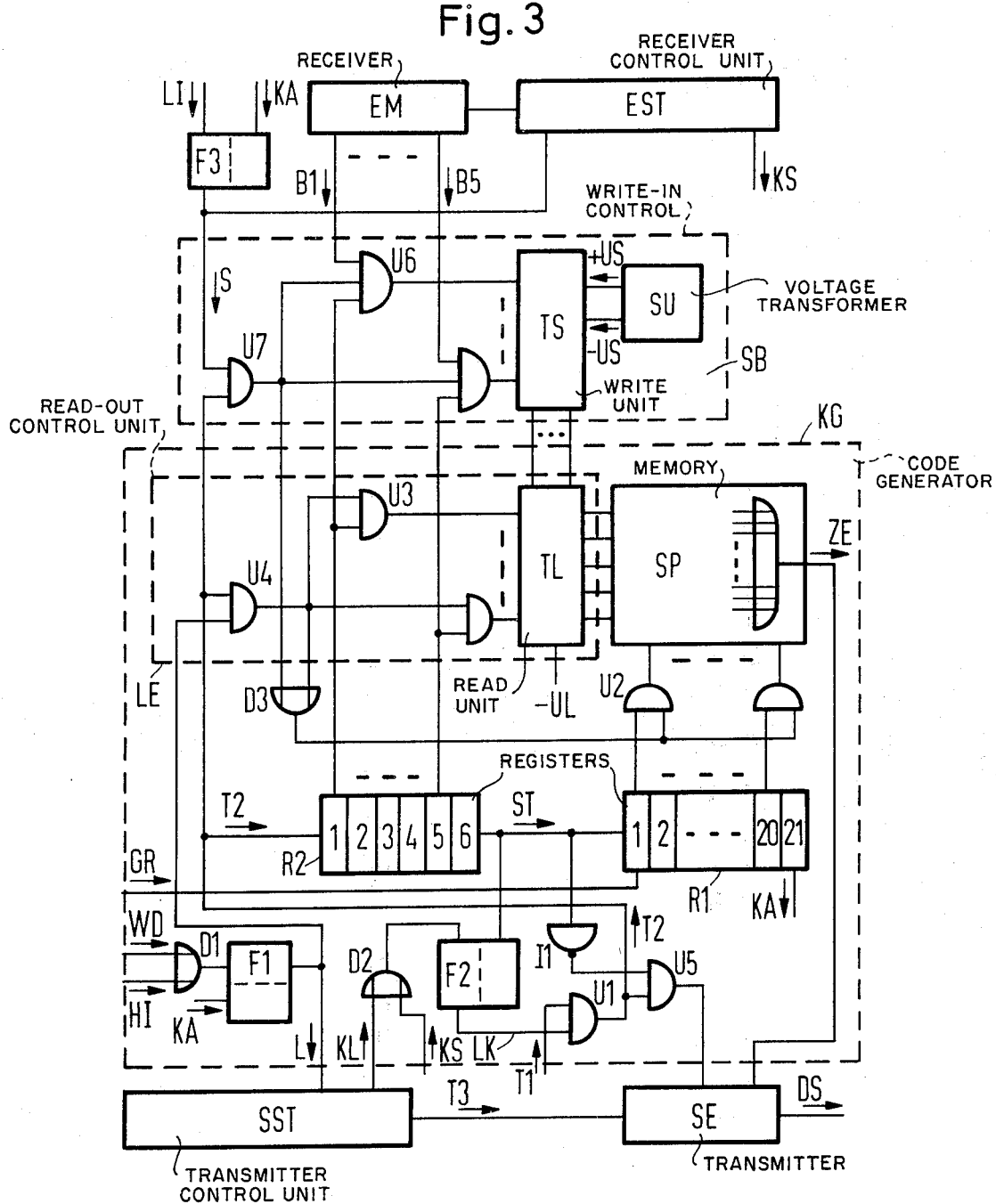
FIG. 3 is a logic circuit diagram of a code generator with an associated write-in control unit.

Referring to FIG. 3, the code generator KG contains the memory SP, two registers R1 and R2 constructed as shift registers with feedback and a read out control unit LE. The memory SP is designed to store 20 character signals, each having five bits, and thus contains 100 storage elements arranged in 20 columns and five rows.

Upon reading of the character signals from the memory, the individual columns are called up consecutively from the memory with the aid of the register R1 and within each column the five rows are in each case called up in turn with the aid of the register R2. In the registers R1 and R2 one position has the binary value 1 and the other positions have the binary value 0. The positions which exhibit the binary value 1 are assigned to a called up row and column.

On writing of the character signals into the memory SP, the storage cells are operated in the same manner as in the case of reading through the registers R1 and R2. At the same time, via the transistors TS which are arranged in a write-in control unit, likewise illustrated in FIG. 3, positive or negative voltage pulses are connected to the memory depending upon the binary value which is to be written in.

Further details of the circuit of FIG. 3 and its operation will be described together with reference to the timing diagram illustrated in FIG. 4.

Figure 4:
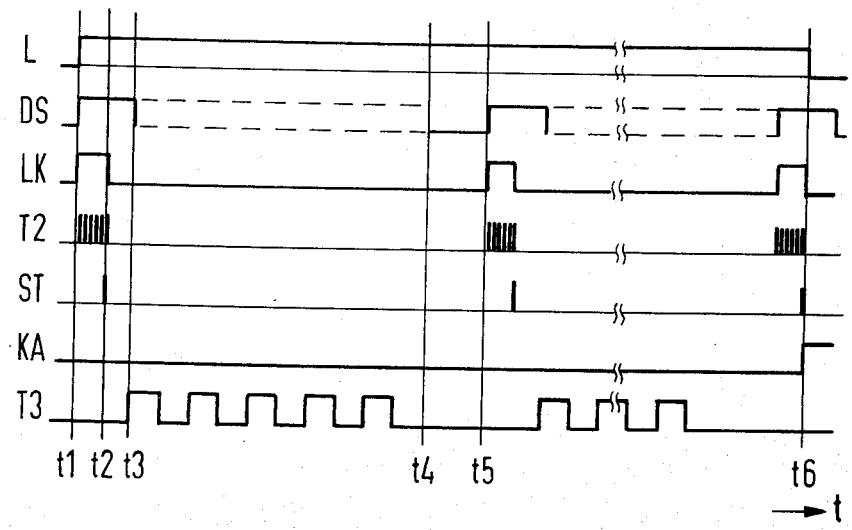
FIG. 4 is a timing diagram illustrating wave forms at various points of the code generator of FIG. 3.

The time diagrams represented in FIG. 4 illustrate signals at various points of the code generator KG. The time $t$ is plotted in the abscissa direction and the amplitude of the signals are represented in the ordinate direction. As all of the signals are binary values, they only assume the binary values referenced 0 and 1.

It will be assumed that the code generator is triggered at the time $t1$. The triggering is effected by a signal WD which is incoming in the teleprinter and which is assigned to the print-out of a key who is there in a distant subscriber station, or by a signal HI which is emitted from the teleprinter and which is produced on the depression of a here is key. The signals WD and HI are connected to an OR gate D1 and a flip-flop F1 is set by the signal at the output of the OR gate gate D1. The flip-flop F1 emits a signal L from its output which prepares for the reading of the character signals from the memory SP. In addition, the signal L acts, via the write-in control unit SST, to prepare the transmitter SE for the transmission of the character signals.

The transmitter SE produces a start signal, and a signal DS at the output of the transmitter which represents the character signals to be transmitted changes its binary value from 0 to 1. At the same time, the write-in control unit SST emits a signal KL which sets a flip-flop F2 by way of an OR gate D2. A signal LK at the output of the flip-flop F2 releases an AND gate U1 to which a pulse train T1 is connected. In the exemplary embodiment of the invention represented in FIG. 3, the pulse train T1 has a repetition frequency of 10 kHz, and is emitted at the output of the AND gate U1 as a pulse train T2 to the read-out control unit LE.

Upon the switching on of the teleprinter, a signal GR has caused the binary value 1 to be entered into the first position of the register R1 and into the sixth position of the register R2. The binary value 1 in the first position of the register R1 releases an AND gate U2 which is assigned to the first column of the memory SP and indicates that read out is taking place from the first column.

The first pulse of the pulse train T2 shifts the contents of the register R2 by one position so that the binary value 1 is now contained in the first position of the register R2. The first position of the register R2 releases an AND gate U3 which is assigned to the first row of the memory SP and causes reading to take place from this row. The pulse train T2 is connected to the AND gate U3 by way of an AND gate U4 and, via an OR gate D3, also to the AND gate U2. The binary value of the storage element which is connected to the first row and the first column is read out by means of the transistors TL. The signal ZE is emitted from the output of the memory and conducted to the transmitter SE. The pulse train T2 is likewise conducted, via an AND gate U5, to the transmitter SE and inputs the instantaneous binary value of the signal ZE into a register of the transmitter SE.

With the next pulse of the pulse train T2, the binary value 1 of the first position of the register R2 is shifted into the second position and the first position reassumes the binary value 0. The AND gate U3 is blocked and a non-illustrated AND gate assigned to the second row of the memory is released. During the pulse, the storage element is read out in the second row and the first column. The binary value of the signal ZE at the output of the memory is again input into the register in the transmitter SE by the pulse train T2.

With the next three pulses of the pulse train T2, in the same manner, the remaining storage elements of the first column are read out and the binary values of the signal ZE are stored in the transmitter SE.

The following pulse of the pulse train T2 shifts the binary value 1 from the fifth position to the sixth position of the register R2 at the time $t2$. With this shift of information, the register R2 emits a pulse train ST to the register R1. This pulse train ST shifts the binary value 1 in the register R1 from the first to the second position and therefore prepares the memory SP for read out of the storage elements arranged in the second column. At the same time, the pulse train ST resets the flip-flop F2 and, by way of the signal LK, blocks the emission of further pulses of the pulse train T2. Also, the pulse train ST blocks the AND gate U5 by way of an inverter I1 in order to prevent further binary values from being input into the transmitter SE.

At the time $t3$ the transmitter SE ends the start element and the signal DS at its output changes its binary value from 1 to 0. After the start element, the transmitter control unit SST emits a telegraphy pulse train T3 to the transmitter SE. The repetition frequency of the telegraphy pulse train T3 is assigned to a data transmission speed, e.g. 100 Bd. With the telegraphy pulse train T3, the first character signal stored in the transmitter SE is read out and fed via the line matching unit LA to the teleprinter line. After five pulses of the telegraphy pulse train T3, the transmitter SE produces a stop element at the time $t4$.

At the time $t5$, a new start element is emitted. At the same time, the flip-flop F2 is set again. The next pulse of the pulse train T2 shifts the binary value from the sixth position of the register R2 back into the first position and, in the same way as with the first character signal, now the second character signal is read out from the second column of the memory SP and input into the transmitter SE. Then the second character signal is read out of the transmitter SE with the telegraphy pulse T3 and emitted to the line matching unit LA.

This process is repeated until the 20th character signal has been read out. The pulse train ST which occurs after the 20th character signal at the time $t6$ shifts the binary value 1 from the 20th to the 21st position of the register R1. At the output of the 21st position a signal KA is emitted which indicates that the code generator KG has come to the end of the cycle. The signal KA assumes the binary value 1 and resets the flip-flop F1. The signal L at the output of the flip-flop F1 therefore changes its binary value from 1 to 0 and blocks the AND gate U4. The read out of the character signals from the memory SP is therefore completed.

The transmitter control unit SST emits a further five pulses of the telegraphy pulse train T3 to the transmitter SE in order to transmit the 20th character signal. Subsequently, the transmission of the character signals emitted from the code generator KG is at an end.

A write-in control unit SB arranged on a plug-in component assembly serves to effect recordings in the memory SP. The write-in control unit SB is plugged in only when required, for example by a servicing engineer, in order to alter the stored character signals. The write-in control unit SB contains the transistors TS, a voltage transformer SU for the generation of the voltages +US and −US and a plurality of AND gates.

The character signals to be written into the memory SP are made available by way of a keyboard TA or by way of the punched tape read out device LL. When the teleprinter and the tape reader LL are switched on, a signal IL sets a flip-flop F3. A signal S at the output of the flip-flop F3 is conducted, on the one hand, to the write-in control unit SB and, on the other hand, to the receiver control unit EST. The receiver control unit EST transfers the first character signal supplied by the punched tape read-out device LL or from the keyboard TA into the receiver EM and makes it available as a parallel-coded character signal at the output. The character signal is represented by five signals B1 to B5.

In the same way as in the case of read-out prior to write-in of the character signals into the memory, the registers R1 and R2 are, for example during the connection of the teleprinter, brought back into their basic position by the signal GR. The receiver control unit EST emits a signal KS which releases the write-in of the character signals into the memory SP. The signal KS sets the flip-flop F2 via the OR gate D2. Thus, in the same way as in the case of read-out of the character signals from the memory SP, the AND gate U2 emits the pulse train T2.

The first pulse of the pulse train T2 again shifts the contents of the register R2 by one position and the first position assumes the binary value "1". Therefore, the AND gate U6 assigned to the first row of the memory is released. The pulse of the pulse train T2 is conducted, via an AND gate U7, to a second input of the AND gate U6 and swiches through the binary signal B1 to the transistors TS. By means of the transistors TS, the binary value of the signal B1 is written into the storage cell which is located in the first row and the first column of the memory SB. With the next pulses of the pulse train T2 the registers R1 and R2 are advanced in the same way as with read-out and the relevant binary values of the signals B1 to B5 are entered into the storage cells.

Firstly, the binary values 0 are written into all the storage cells in order to erase the memory SP. The signals B1 to B5 assume the binary values 0 for example after the depression of the key "letters" and the inversion of the associated character signal.

When the binary value 1 in the register R1 has reached the 21st position, following the erasure of the memory, a signal KA is emitted which resets the flip-flop F3.

After the disconnection and the reconnection of the punched tape read-out device LL, the signal L1 resets the flip-flop F3 and the signal GR brings the registers R1 and R2 back to their basic positions. Now the character signals input the keyboard TA, or by the punched tape read-out device LL, are input into the memory SP in the same way as in the case of erasure. During the write-in, these character signals are printed out in the printer DR of the teleprinter for the purpose of checking data. When the binary value 1 in the register R1 has again reached the 21st position, the flip-flop F3 is reset again and the recording in the memory SP is at an end. If, instead of a memory SP in which repeated recordings can be made, a fixed word store is used in which the character signals cannot be altered, the write-in control unit SB is not required. In this case, the data content of the memory is recorded, for example, by the manufacturer. Nevertheless, in order to attain good possibilities of changing the character signals, it is expedient to arrange the fixed word store so as to be capable of being plugged in so that the same may be the subject of a controlled access by authorized personnel and so that the same may be exchanged with another such unit.

Although the invention has been described by reference to a particular illustrative embodiment thereof, many changes and modifications of the invention may become apparent to those skilled in the art without departing from the spirit and scope of the invention. It is therefore intended that the patent warranted hereon include all such changes and modifications as may reasonably and properly be included within the scope of this contribution to the art.

What is claimed is:

1. An answer back code generator for a teleprinter or data printer and operated to generate a sequence of character signals as subscriber recognition signals when connected to another subscriber, comprising:

a memory means for storing a sequence of characters assigned to a subscriber, including a plurality of electronically operable storage elements for storing character signals, said storage elements constructed to retain stored data unaltered upon disconnection of the operating voltage;

a pulse generator;

register means operably connected to said memory means and containing the addresses of particular operated storage elements, including means connected to said pulse generator for receiving pulse trains and responsive thereto to step-by-step alter the content of said register means; and a read-out control unit connected to said memory means and adapted to receive a reading control signal to cause reading of the characters stored in the addressed storage elements.

2. A code generator according to claim 1, said memory means comprises a semiconductor memory.

3. A code generator according to claim 1, wherein said memory means comprises a semiconductor memory including MNOS transistor storage elements into which data can be recorded as often as desired.

4. A code generator according to claim 1, wherein said memory means comprises a fixed word store whose contents cannot be altered after write-in of the character signals.

5. A code generator according to claim 4, wherein said fixed word store is constructed as a plug-in unit.

6. A code generator according to claim 1, wherein said plurality of storage elements are arranged in a matrix of columns and rows.

7. A code generator according to claim 1, wherein said plurality of storage elements are arranged in a matrix of columns and rows, and wherein said register means comprises a first shift register constructed to operate with feedback and operably associated with the columns of said storage elements and a shift second register constructed to operate with feedback and operably associated with the rows of said storage elements, said second shift register connected to advance said first shift register one position upon completion of a cycle of said second shift register.

8. A code generator according to claim 7, comprising means for supplying a pulse train to said second shift register at a predetermined repetition frequency.

9. A code generator according to claim 1, comprising a write-in control unit operably connected to said memory for writing the character signals into said memory.

10. A code generator according to claim 9, wherein said write-In control unit is constructed as a plug-in unit.

* * * * *